United States Patent
Joshi et al.

(10) Patent No.: US 12,123,353 B2
(45) Date of Patent: Oct. 22, 2024

(54) INTEGRATED FUEL CELL AND ENGINE COMBUSTOR ASSEMBLY

(71) Applicant: General Electric Company, Schenectady, NY (US)

(72) Inventors: Narendra D. Joshi, Schenectady, NY (US); Hendrik Pieter Jacobus de Bock, Clifton Park, NY (US); Honggang Wang, Clifton Park, NY (US); Anil R. Duggal, Niskayuna, NY (US); Richard L. Hart, Broadalbin, NY (US); Seung-Hyuck Hong, Clifton Park, NY (US)

(73) Assignee: General Electric Company, Evendale, OH (US)

( * ) Notice: Subject to any disclaimer, the term of this patent is extended or adjusted under 35 U.S.C. 154(b) by 104 days.

(21) Appl. No.: 17/307,780

(22) Filed: May 4, 2021

(65) Prior Publication Data

US 2022/0356847 A1 Nov. 10, 2022

(51) Int. Cl.
*F02C 7/224* (2006.01)
*F02C 9/50* (2006.01)
(Continued)

(52) U.S. Cl.
CPC .............. *F02C 7/224* (2013.01); *F02C 9/50* (2013.01); *F23R 3/343* (2013.01); *F23R 3/40* (2013.01); *H01M 8/04716* (2013.01); *H01M 8/04731* (2013.01); *H01M 8/04761* (2013.01); *F05D 2220/323* (2013.01); *F05D 2220/762* (2013.01); *F05D 2240/35* (2013.01); *F05D 2260/232* (2013.01); *F05D 2260/99* (2013.01); *F05D 2270/303* (2013.01); *F05D 2270/3061* (2013.01)

(58) Field of Classification Search
None
See application file for complete search history.

(56) References Cited

U.S. PATENT DOCUMENTS

| 5,541,014 A | 7/1996 | Micheli et al. |
| 5,858,314 A | 1/1999 | Hsu et al. |
(Continued)

FOREIGN PATENT DOCUMENTS

| CA | 2446360 A1 | 4/2004 |
| CN | 100367556 C | 2/2008 |
(Continued)

*Primary Examiner* — Gerald L Sung
*Assistant Examiner* — Jacek Lisowski
(74) *Attorney, Agent, or Firm* — Dority & Manning, P.A.

(57) ABSTRACT

An engine assembly includes a combustor, a fuel cell stack integrated with the combustor, and a pre-burner system fluidly connected to the fuel cell stack. The fuel cell stack is configured to direct fuel and air exhaust from the fuel cell stack into the combustor. The pre-burner system is configured to control a temperature of an air flow directed into the fuel cell stack. The combustor is configured to combust the fuel and air exhaust from the fuel cell stack into one or more gaseous combustion products that drive a downstream turbine. The engine assembly can further include a catalytic partial oxidation convertor that is fluidly connected to the fuel cell stack. The catalytic partial oxidation convertor is configured to develop a hydrogen rich fuel stream to be directed into the fuel cell stack.

19 Claims, 4 Drawing Sheets

(51) Int. Cl.
*F23R 3/34* (2006.01)
*F23R 3/40* (2006.01)
*H01M 8/04701* (2016.01)
*H01M 8/04746* (2016.01)

(56) References Cited

U.S. PATENT DOCUMENTS

| | | | |
|---|---|---|---|
| 6,095,793 A * | 8/2000 | Greeb | F23N 1/002 |
| | | | 431/170 |
| 6,255,010 B1 | 7/2001 | George et al. | |
| 7,150,143 B2 | 12/2006 | Schick et al. | |
| 7,279,243 B2 | 10/2007 | Haltiner, Jr. et al. | |
| 7,285,350 B2 | 10/2007 | Keefer et al. | |
| 7,966,830 B2 | 6/2011 | Daggett | |
| 2008/0155984 A1 | 7/2008 | Liu et al. | |
| 2009/0214910 A1* | 8/2009 | Brantley | B01B 1/005 |
| | | | 429/423 |
| 2010/0077726 A1* | 4/2010 | Joshi | F23R 7/00 |
| | | | 60/730 |
| 2013/0025254 A1* | 1/2013 | Kurosaka | F23C 13/02 |
| | | | 60/39.24 |
| 2013/0061598 A1* | 3/2013 | Widener | F23R 3/34 |
| | | | 60/776 |
| 2014/0047814 A1 | 2/2014 | Steinwandel et al. | |
| 2017/0237088 A1 | 8/2017 | Ukai et al. | |
| 2019/0063283 A1 | 2/2019 | Ahn et al. | |
| 2019/0136761 A1 | 5/2019 | Shapiro et al. | |
| 2019/0170355 A1* | 6/2019 | Tentorio | F23R 3/286 |
| 2020/0194799 A1 | 6/2020 | Hart et al. | |

FOREIGN PATENT DOCUMENTS

| | | |
|---|---|---|
| CN | 106968793 A | 7/2017 |
| CN | 110071309 A | 7/2019 |
| DE | 102005012230 A1 | 10/2005 |
| EP | 0967676 A1 | 12/1999 |
| EP | 2800186 B1 | 2/2018 |
| WO | 9965097 A1 | 12/1999 |
| WO | 2019160036 A1 | 8/2019 |

\* cited by examiner

INTEGRATED FUEL CELL AND ENGINE COMBUSTOR ASSEMBLY

TECHNICAL FIELD

The present disclosure generally relates to power-generating systems, such as fuel cells and gas turbine engines. In particular, the present disclosure relates to a combination of a combustion system with an integrated fuel cell for a gas turbine engine. The present disclosure further relates to the inclusion of (i) a pre-burner system for increasing the air temperature of the fuel cell that is integrated within the combustor of the gas turbine engine, and/or (ii) a catalytic partial oxidation (C-POX) convertor for developing a hydrogen rich fuel stream.

BACKGROUND

Fuel efficiency of engines can be an important consideration in the selection and operation of the engines. For example, fuel efficiency of gas turbine engines in aircraft can be an important (and a limiting) factor on how far the aircraft can travel. Some aircraft propulsion systems can include fuel cells in addition to the gas turbine engines. These fuel cells can be located upstream of or surrounding combustors and downstream from compressors of the gas turbine engines. Compressed air that is output by the compressors flows along the length of the engine and into the fuel cells. Part of this air is consumed by the fuel cells in generating electrical energy. The rest of the air can flow through or around the fuel cells and into a combustor. This air is then mixed with fuel and combusted in a combustor of the engine.

One problem with known fuel cell-combustor combinations is the requirement of conduits to direct the flow of air into the fuel cells and out of the fuel cells into the combustor. These conduits can increase the size of the fuel cell and engine combination. In addition, the air coming from the compressor must generally be heated to ensure that the air is sufficiently hot for consumption within the fuel cells. This heating of the air coming from the compressor can require the inclusion of heating elements, such as heat exchangers, which further increases the weight and volume of the system.

BRIEF SUMMARY

An engine assembly comprising: (a) a combustor; (b) a fuel cell stack integrated with the combustor, the fuel cell stack configured to direct fuel and air exhaust from the fuel cell stack into the combustor; and (c) a pre-burner system fluidly connected to the fuel cell stack, the pre-burner system being configured to control a temperature of an air flow directed into the fuel cell stack, wherein the combustor is configured to combust the fuel and air exhaust from the fuel cell stack into one or more gaseous combustion products that drive a downstream turbine.

An engine assembly comprising: (a) a combustor; (b) a fuel cell stack integrated with the combustor, the fuel cell stack configured to direct fuel and air exhaust from the fuel cell stack into the combustor; (c) a pre-burner system fluidly connected to the fuel cell stack, the pre-burner system being configured to control a temperature of an air flow directed into the fuel cell stack; and (d) a catalytic partial oxidation convertor that is fluidly connected to the fuel cell stack, wherein the catalytic partial oxidation convertor is configured to develop a hydrogen rich fuel stream to be directed into the fuel cell stack, wherein the combustor is configured to combust the fuel and air exhaust from the fuel cell stack into one or more gaseous combustion products that drive a downstream turbine.

A method comprising: (a) heating air discharged from a compressor in a pre-burner system; (b) outputting air that is heated by the pre-burner system into fuel cells of a fuel cell stack; (c) directing fuel into the fuel cells of the fuel cell stack; (d) converting at least some of the air that enters the fuel cells of the fuel cell stack from the pre-burner system and the fuel into electrical current using the fuel cell stack; (e) directing fuel and air exhaust from the fuel cell stack (e.g., radially and/or axially) into a combustor toward an annular axis of the combustor; (f) combusting the fuel and air exhaust from the fuel cell stack into one or more gaseous combustion products in the combustor; and (g) driving a turbine of a turbine engine using the one or more gaseous combustion products.

Additional features, advantages, and embodiments of the present disclosure are set forth or apparent from consideration of the following detailed description, drawings, and claims. Moreover, it is to be understood that both the foregoing summary and the following detailed description are exemplary and intended to provide further explanation without limiting the scope of the disclosure as claimed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
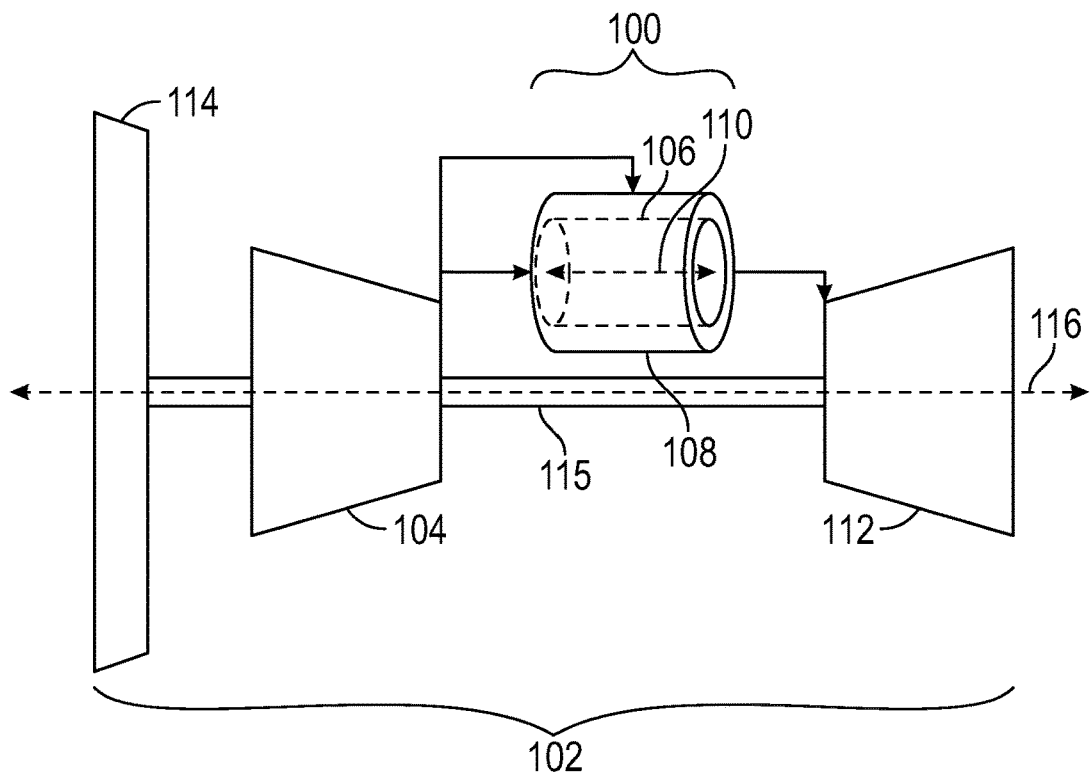
FIG. 1 illustrates a combination of a combustion system with an integrated fuel cell used in a gas turbine engine system, according to an embodiment of the present disclosure.

Various embodiments are discussed in detail below. While specific embodiments are discussed, this is done for illustration purposes only. A person skilled in the relevant art will recognize that other components and configurations may be used without departing from the spirit and scope of the disclosure.

The present disclosure relates to a combination of a combustion system with an integrated fuel cell for a gas turbine engine. The present disclosure further relates to the inclusion of (i) a pre-burner system for controlling the air temperature of the fuel cell that is integrated within the combustor of the gas turbine engine, and/or (ii) a catalytic partial oxidation convertor for developing a hydrogen rich fuel stream. For example, gas turbine engines, such as those used with airplanes, function with variable altitude and operating conditions, which results in air being discharged from the compressor having a variable temperature that can range from 200° C. to 700° C. However, fuel cell technology, such as solid oxide fuel cells (SOFCs), usually requires the cell to operate at, for example, 600° C. to 800° C. to be efficient, and with a fuel stream rich in hydrogen and carbon monoxide. Thus, according to embodiments of this disclosure, a pre-burner system can be included to control the air temperature leaving the pre-burner system toy, for example, an operating point of the fuel cell (e.g., SOFC), including, e.g., 600° C. to 800° C., at all operating conditions.

In general, a solid oxide fuel cell consumes between 1% and 50% of the fuel energy in generating electricity. Traditional fuel cells keep the air and fuel sides of the fuel cell separate and recycle the fuel to maximize conversion of fuel in the fuel cycle. This requires a substantial balance of heat exchangers, pumps, and plumbing, all of which can be eliminated by the integrated combustor and fuel cell of the present disclosure. For example, according to embodiments of this disclosure, unburned fuel and air from the solid oxide fuel cell are dumped directly into the gas turbine combustor and consumed.

According to one embodiment of the present disclosure, a combination of a combustion system with an integrated fuel cell for a gas turbine engine is combined with (i) a catalytic partial oxidation (C-POX) convertor for developing a hydrogen rich fuel stream and (ii) a pre-burner system for raising the air temperature to, for example, an operating point (e.g., 600° C. to 800° C.) for a solid oxide fuel cell that is designed into the outer and/or inner liners of the gas turbine combustor and/or up to 200° C. less than and/or up to 200° C. more than the operating point of the fuel cell. In operation, a pilot/main burner, typically present in conventional gas turbine combustors, is used to start the gas turbine engine and to increase the operating temperature, pressure, and mass flow of air. Once the temperature, pressure, and mass air flow are sufficiently high, a portion of fuel is diverted to (i) the catalytic partial oxidation (C-POX) convertor and (ii) the pre-burner system to increase the temperature of a portion of air coming from the compressor to facilitate the functioning of the solid oxide fuel cell located within the combustor liner region. A hydrogen and carbon monoxide stream, which is developed in the catalytic partial oxidation convertor, is utilized along with the air heated by the pre-burner system in the solid oxide fuel cell to generate electrical power. Unburned fuel and air from the solid oxide fuel cell is channeled into the combustor where a pilot/main flame is present and provides ignition to consume any unburned hydrogen and carbon monoxide effluents from the solid oxide fuel cell. The heated air is then channeled into the gas turbine nozzle for work extraction by the turbine.

According to one embodiment, hydrogen ($H_2$) fuel can be used as one of the fuel sources with the combustion system having the integrated fuel cell, as opposed to (or in addition to) a hydrocarbon fuel source. According to this embodiment, a catalytic partial oxidation (C-POX) convertor may not be necessary for this hydrogen ($H_2$) fuel source, and thus, the hydrogen ($H_2$) fuel stream can be directed into the fuel cell (e.g., SOFC) that is designed into the outer and/or inner liners of the gas turbine combustor. According to one embodiment, when hydrogen ($H_2$) fuel is the fuel source, a heat-exchanger, a pre-burner system, and/or a catalytic partial oxidation (C-POX) convertor can be included to control the temperature of the hydrogen ($H_2$) fuel to at least one of (i) an operating point of the fuel cell (e.g., SOFC), (ii) up to 200° C. less than the operating point of the fuel cell (e.g., SOFC), and (iii) up to 200° C. more than the operating point of the fuel cell (e.g., SOFC).

According to another embodiment, the pre-burner system is configured to increase the temperature of a portion of air coming from the compressor to facilitate the functioning of the fuel cell located within the combustor liner region. For example, according to one embodiment, if the operating point of the fuel cell (e.g., SOFC) is 600° C., the pre-burner system is configured to increase the temperature of a portion of air coming from the compressor to 400° C. to 800° C. According to another embodiment, if the operating point of the fuel cell (e.g., SOFC) is 700° C., the pre-burner system is configured to increase the temperature of a portion of air coming from the compressor to 500° C. to 900° C. According to yet another embodiment, if the operating point of the fuel cell (e.g., SOFC) is 800° C., the pre-burner system is configured to increase the temperature of a portion of air coming from the compressor to 600° C. to 1000° C.

One or more embodiments described herein provide fuel cell and combustor assemblies for engine systems, such as, e.g., gas turbine engines of aircraft (or other vehicles or stationary power-generating systems). The assemblies (and accompanying methods described herein) integrate fuel cells (e.g., solid oxide fuel cells) and a combustor of an engine to provide electrical power and propulsion power in a thermally efficient manner. A fuel cell stack is arranged around the exterior of a combustor of the engine such that air flows radially inward through the fuel cells in the fuel cell stack, and into the combustor toward a center or annular axis of the combustor. The fuel cell stack can be integrated directly into the outer and/or inner liners of the combustor or combustion chamber such that no additional conduits or ducting is needed to fluidly couple the fuel cell stack with the combustor.

The fuel cell and combustor assemblies described herein can be used to generate electrical power for the creation of thrust in addition to that provided by engine exhaust. For example, the draw of electrical current from the fuel cell stack in a gas turbine engine can be used to power one or more motors that add torque to a fan of the gas turbine engine. This increases overall fuel efficiency of a propulsion system that includes the fuel cells and combustors. For example, there is potential for at least a 10% or more reduction in fuel burn to complete a mission.

FIG. 1 illustrates one embodiment of a combination of a combustion system with an integrated fuel cell (i.e., a fuel cell and combustor assembly 100) used in a gas turbine engine 102. The gas turbine engine 102 includes a shaft 115 that mechanically connects at least one compressor 104 to a turbine 112. The at least one compressor 104 receives inlet air and compresses this air via one or more stages of rotating blades. The compressed air is directed into the fuel cell and combustor assembly 100.

The assembly 100 includes an annular combustor 106 that is circumferentially surrounded along some or all of the length of the combustor 106 by a fuel cell stack 108. The fuel cell stack 108 includes multiple fuel cells arranged to convert fuel and compressed air from the compressor 104 into electrical energy. The fuel cell stack 108 can be integrated into the outer portion of the combustor 106 such that the fuel cell stack 108 is part of the combustor 106 and is located radially outside of the combustor 106 (e.g., relative to an annular axis 110 of the combustor 106). The engine system 102 includes a center axis 116 that may be coincident with the annular axis 110 or may not be coincident with the annular axis 110.

Some of the compressed air exiting the compressor 104 is directed through the fuel cells in the fuel cell stack 108 in radially inward directions toward the annular axis 110 of the combustor 106. Some or all of the remaining amount of compressed air from the compressor 104 is directed into the combustor 106 in a direction or directions along or parallel to the annular axis 110 of the combustor 106.

The fuel cells in the fuel cell stack 108 receive fuel from fuel manifolds and air from the compressor 104, and convert this fuel and air into electrical energy. Partially oxidized fuel and air exhaust from the fuel cells in the fuel cell stack 108 flow radially inward into the combustor 106 toward the annular axis 110. The partially consumed fuel and air exhaust from the fuel cells, additional air from the compressor 104, and/or additional fuel from one or more fuel injectors for pilot/main burners, typically present in a conventional gas turbine combustor, are combusted within the combustor 106. Exhaust from the combusted fuel and air mixture is then directed into the turbine 112, which converts the exhaust into rotating energy via the shaft 115 that can be used to power one or more loads 114, such as a fan used to propel a vehicle (e.g., an aircraft), a generator, or the like. According to one embodiment, the shaft 115 is a single shaft that connects the load or fan 114 to the compressor 104 and the turbine 112. According to another embodiment, the shaft 115 comprises (i) an outer shaft that connects the compressor 104 to the turbine 112, and (ii) an inner shaft that connects the load or fan 114 to the turbine 112.

Figure 2:
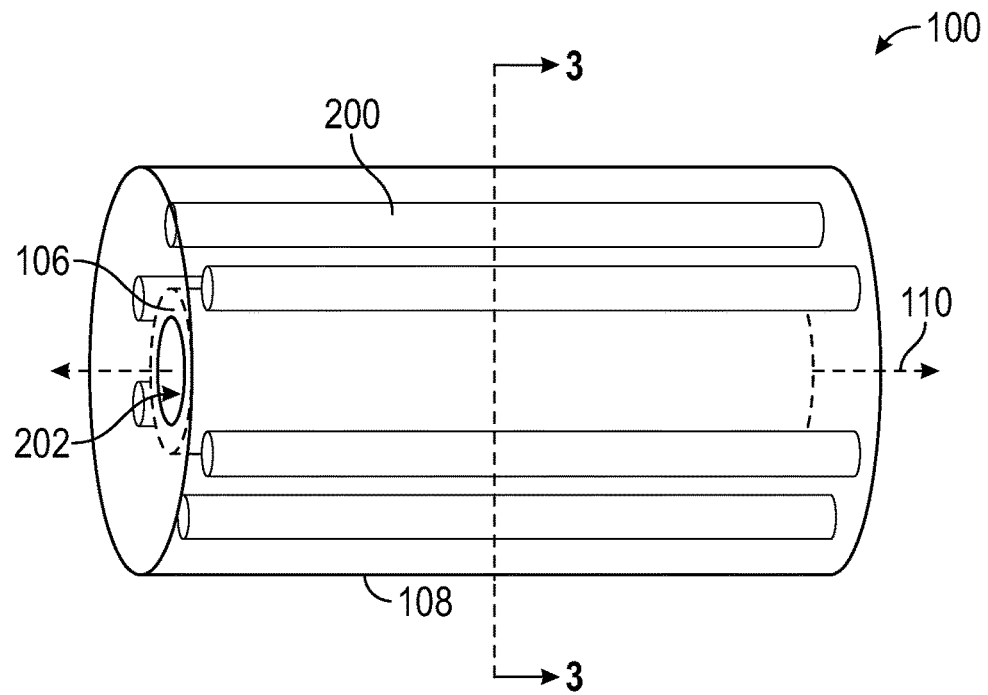
FIG. 2 illustrates the combustion system with an integrated fuel cell shown in FIG. 1 according to an embodiment of the present disclosure.

FIG. 2 schematically illustrates one embodiment of the combination of a combustion system with an integrated fuel cell (i.e., the fuel cell and combustor assembly 100 shown in FIG. 1). As described above, the assembly 100 includes the fuel cell stack 108 located radially outward of the combustor 106 relative to the annular axis 110 of the combustor 106. The fuel cell stack 108 includes several fuel manifolds 200 located at different portions along the perimeter of the combustor 106. The number and/or arrangement of the fuel manifolds 200 shown in FIG. 2 is one embodiment and is not limiting on all embodiments of described herein.

The fuel manifolds 200 are conduits that receive fuel for the fuel cells in the stack 108 and distribute the fuel to the cells. The fuel manifolds 200 can be fluidly coupled with a source of the fuel, such as one or more tanks or other containers of the fuel. The fuel manifolds 200 can include orifices that deliver the fuel to the fuel cells in locations that deliver fuel into fuel flow passages. In one embodiment, the fuel is not simply injected from the fuel manifolds 200 through orifices into the air stream through the combustor 106. Instead, the fuel can be directed into flow passages as described in, for example, US 2019/0136761 A1, which is incorporated by reference herein in its entirety. As further shown in FIG. 2, the fuel manifolds 200 can be elongated conduits that are elongated along directions that are parallel to or otherwise along the annular axis 110 of the combustor 106. Alternatively, the fuel manifolds 200 can have another shape, such as rings that encircle the combustor 106.

In one embodiment, the fuel manifolds 200 can be individually controlled. For example, a controller (or control system) (e.g., hardware circuitry that includes and/or is coupled with one or more processors, such as microprocessors) can control valves which, in turn, control the flow of fuel to different ones of the fuel manifolds 200. The amount of current that is drawn from the fuel cell stack 108 can be controlled (e.g., by the controller) during operation of an engine that includes the assembly 100. The controller can close or open valves to decrease or to increase (respectively) the amount of fuel flowing into the fuel cell stack 108. The amount of fuel flowing into the fuel cell stack 108 can be decreased to decrease the electrical current generated by the fuel cell stack 108, or can be increased to increase the current generated by the fuel cell stack 108. Optionally, no fuel can be delivered to the fuel cell stack 108 via the manifolds 200 to prevent the fuel cell stack 108 from generating any electrical current.

The fuel cell stack 108 directly abuts the combustor 106 along the length of the combustor 106. The fuel cell stack 108 can form the outer surface or boundary of the combustor 106. This can include the fuel cell stack 108 being integrally formed with the combustor 106. This arrangement reduces or eliminates the need to include additional ducting to fluidly couple the fuel cell stack 108 with the combustor 106. The combustor 106 receives unspent fuel and air from the fuel cell stack 108 along radially inward directions oriented toward the annular axis 110 of the combustor 106. The combustor 106 also can receive supplemental fuel and air from the compressor 104. This supplemental fuel and air does not pass or flow through any fuel cells in the fuel cell stack 108, and can flow into the combustor 106 in directions along or parallel to the annular axis 110. The combustor 106 further includes an interior portion 202 that is coupled with the compressor 104 and/or the turbine 112, via, e.g., a shaft (see, e.g., shaft 115 of FIG. 1).

Figure 3:
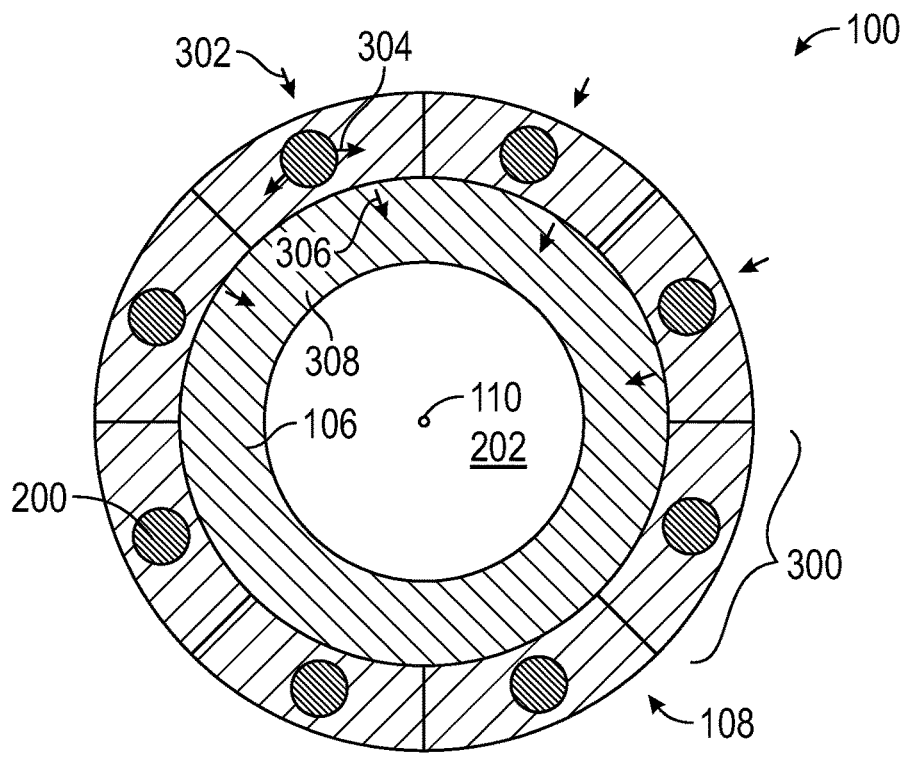
FIG. 3 illustrates a cross-sectional view of the combustion system with an integrated fuel cell shown in FIG. 1 taken along line 3-3 in FIG. 2 according to an embodiment of the present disclosure.

FIG. 3 illustrates a cross-sectional view of one embodiment of a combination of the combustion system with an integrated fuel cell (i.e., the fuel cell and combustor assembly 100 of FIG. 1) along line 3-3 shown in FIG. 2. As shown, the fuel cell stack 108 circumferentially extends around the combustor 106 by completely encircling the combustor 106 around the annular axis 110. The fuel cell stack 108 includes several fuel cells 300 that generate electrical current. These fuel cells 300 are solid oxide fuel cells in one embodiment. Alternatively, the fuel cells 300 can be another type of fuel cell. The fuel cells 300 are formed as parts or segments of an annulus that encircles the combustor 106.

The fuel cells 300 that are visible in FIG. 3 may be a single ring or an annulus of fuel cells 300 that encircles the combustor 106, with many more fuel cells 300 axially stacked together to form the fuel cell stack 108. For example, multiple additional rings of fuel cells 300 may be placed on top of each other to form the fuel cell stack 108 that is elongated along the annular axis 110. While eight fuel cells 300 are shown in the ring in FIG. 3, more or fewer fuel cells 300 can form the ring that encircles the combustor 106.

The fuel cells 300 in the stack 108 are positioned to receive discharged air 302 from the compressor 104 (and/or a pre-burner system as described further below) and fuel 304 from the fuel manifolds 200 (and/or a catalytic partial oxidation convertor as described further below). The fuel cells 300 generate electrical current using this air 302 and at least some of this fuel 304, and radially direct partially oxidized fuel 306 and unused air 308 into the combustor 106 toward the annular axis 110. The combustor 106 combusts the partially oxidized fuel 306 and air 308 into one or more gaseous combustion products (e.g., exhaust), that are directed into and drive the downstream turbine 112.

Figure 4:
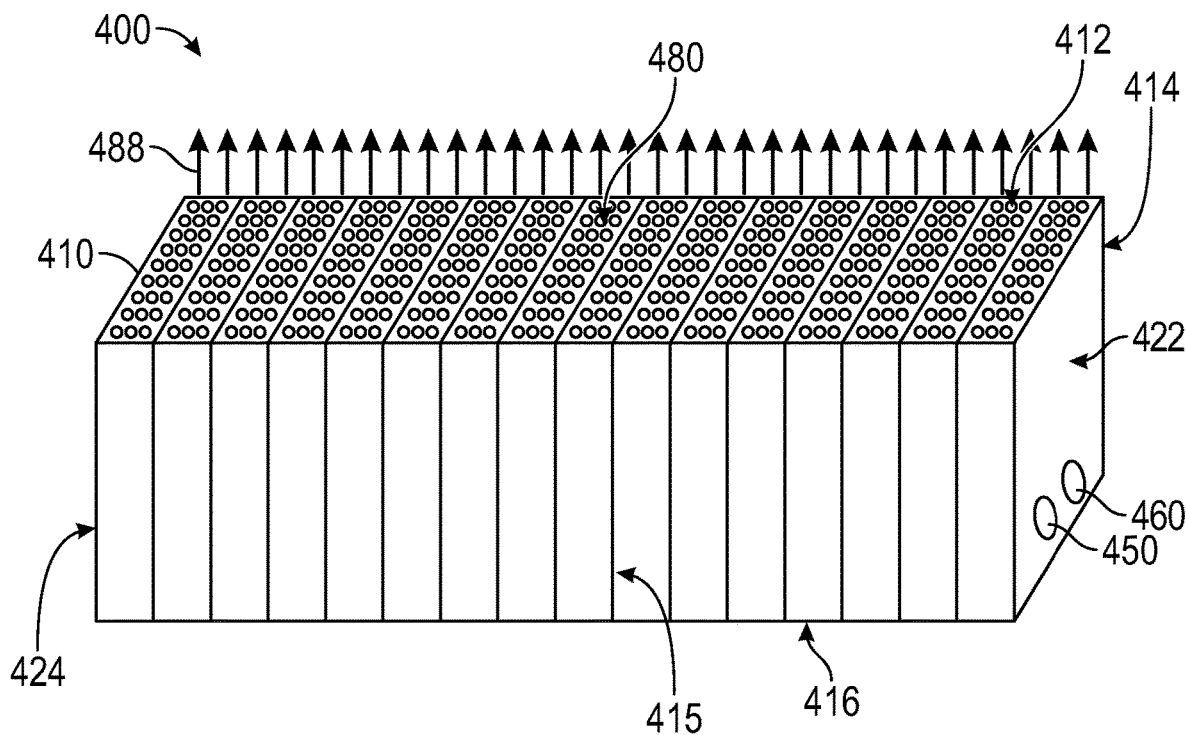
FIG. 4 illustrates a combination of a combustion system with an integrated fuel cell according to an embodiment of the present disclosure.

FIG. 4 illustrates a perspective view of another embodiment of a combination of a combustion system with an integrated fuel cell (i.e., a fuel cell and combustor system 400) that can be used in a gas turbine engine system (e.g., gas turbine engine 102 of FIG. 1), which is further described in, e.g., US 2020/0194799 A1, which is incorporated by reference herein in its entirety. The system 400 includes a housing 410 having a combustion outlet side 412 and a side 416 that is opposite to the combustion outlet side 412, a fuel and air inlet side 422 and a side 424 that is opposite to the fuel and air inlet side 422, and sides 414, 415. The sides 414 and 416 are not visible in the perspective view of FIG. 4. The shape of the housing 410 may differ from what is shown in FIG. 4. For example, the housing 410 need not have a rectangular or a cubic shape, in another embodiment.

The outlet side 412 includes several combustion outlets 480 from which combustion gas(es) 488 is directed out of the housing 410. As described herein, the combustion gas 488 can be created using fuel and air that is not consumed by fuel cells in a fuel cell stack inside the housing 410. This combustion gas 488 can be used to generate propulsion or thrust for a vehicle, such as a manned or an unmanned aircraft.

The air inlet side 422 includes one or more fuel inlets 450 and one or more air inlets 460. Optionally, one or more of the inlets 450, 460 can be on another side of the housing 410. The fuel inlet 450 is fluidly coupled with a source of fuel for the fuel cells, such as one or more pressurized containers of a hydrogen-containing gas and/or a catalytic partial oxidation convertor as described further below. Alternatively, another type or source of fuel may be used. The air inlet 460 is fluidly coupled with a source of air for the fuel cells, such as air that is discharged from a compressor provided with a gas turbine engine (see, e.g., air 302 coming from compressor 104 in the gas turbine engine system 102 of the embodiment of FIGS. 1 to 3) and/or a pre-burner system as described further below. Alternatively, another source of air may be provided, such as, e.g., one or more pressurized containers of oxygen gas. The inlets 450, 460 separately receive the fuel and air from the external sources of fuel and air, and separately direct the fuel and air into the fuel cells.

In one embodiment, the air inlet side 422 and the outlet side 412 may be the only sides of the housing 410 that are not sealed. For example, the housing 410 may be sealed to prevent ingress or egress of fluids (gas and/or liquid) into and out of the housing 410, but for the fuel and air inlets 450, 460 and the combustion outlets 480. The air and fuel that are directed into the housing 410 via the inlets 450, 460 may be entirely or substantially consumed (e.g., at least 98% of the volume or mass is consumed) by the fuel cells inside the housing 410 and/or the generation of combustion gas 488. This can allow for the housing 410 to have no other outlet through which any fuel or air passes aside from the combustion outlets 480 through which the combustion gas 488 exits the housing 410. According to one embodiment, partially oxidized fuel and unused air from the fuel cells inside the housing 410 can be directed into a combustor, such that the combustor combusts the partially oxidized fuel and air into one or more gaseous combustion products (e.g., exhaust), that are directed into and drive a downstream turbine (see, e.g., combustor 106 and turbine 112 of the gas turbine engine system 102 of the embodiment of FIGS. 1 to 3).

In one embodiment, the system 400 can be formed from one hundred fuel cells stacked side-by-side from the end or air inlet side 422 to the opposite side 424. Alternatively, the system 400 can include fewer or more fuel cells stacked side-by-side. According to one embodiment, the system 400 can be eight centimeters tall, 2.5 centimeters wide, and twenty-four centimeters long. Alternatively, the system 400 can be taller or shorter, wider or narrower, and/or longer or shorter than these example dimensions.

According to one embodiment, the combination of the combustion system with an integrated fuel cell (i.e., the fuel cell and combustor system 400) can be integrated into the liner of a combustor such that the combustor is circumferentially surrounded along some or all the length of the combustor by the housing 410 having a fuel cell stack or plurality of fuel cells. Thus, according to this embodiment, the system 400 or housing 410 directly abuts the combustor of, e.g., a gas turbine engine along the length of the combustor (see, e.g., combustor 106 of the gas turbine engine 102 of the embodiment of FIG. 1). The housing 410 can form the outer surface or boundary of the combustor. This can include the housing 410 being integrally formed with the combustor. This arrangement reduces or eliminates the need to include additional ducting to fluidly couple the housing 410 with the combustor. According to another embodiment, the fuel cell stack can be axially coupled to the combustor, meaning the fuel cell stack is upstream of the combustor but not necessarily circumferentially surrounding the combustor.

According to one embodiment, the combustor is fluidly coupled with the housing 410 (see, e.g., combustor 106 of the gas turbine engine 102 of the embodiment of FIGS. 1 to 3). The combustor receives unspent fuel and air (e.g., combustion gas 488) from the housing 410 along radially inward directions oriented toward an annular axis of the combustor (see, e.g., annular axis 110 of the combustor 106 of the embodiment of FIGS. 1 to 3).

According to one embodiment, fuel cells (e.g., SOFCs) within the housing 410 are positioned to receive (i) discharged air from a compressor and/or a pre-burner system as described further below and (ii) fuel from a source, such as, e.g., a catalytic partial oxidation convertor as described further below. The fuel cells within the housing 410 generate electrical current using this air and at least some of this fuel, and radially direct partially oxidized fuel and unused air into the combustor. The combustor combusts the partially oxidized fuel and air into one or more gaseous combustion products (e.g., exhaust), that can be directed into and drive a downstream turbine (see, e.g., combustor 106 and turbine 112 of the gas turbine engine 102 of the embodiment of FIGS. 1 to 3).

Figure 5:
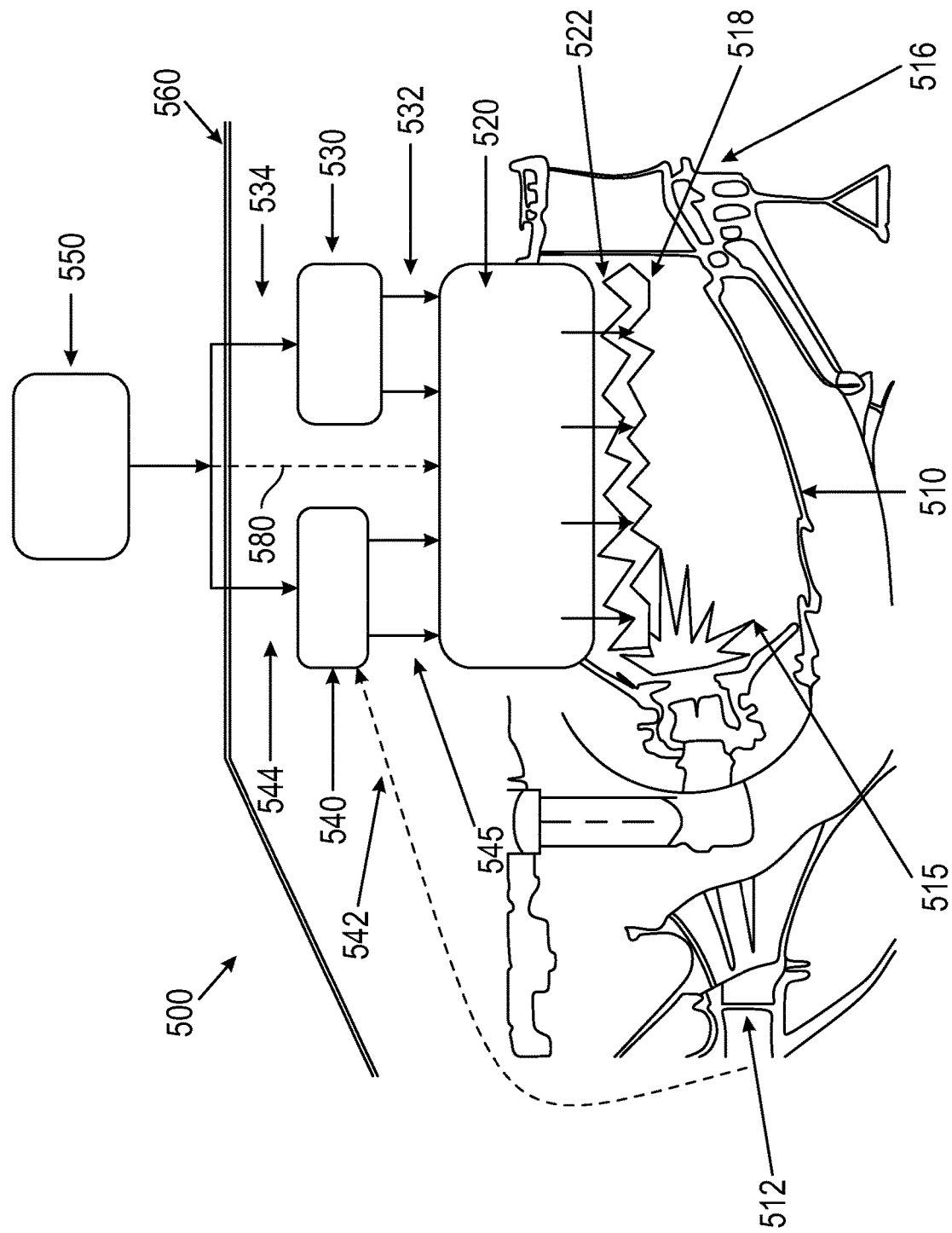
FIG. 5 illustrates a gas turbine engine having a combination of a combustion system with an integrated fuel cell according to one embodiment of the present disclosure.

FIG. 5 illustrates a gas turbine engine having a combination of a combustion system with an integrated fuel cell according to one embodiment of the present disclosure. As shown in FIG. 5, the gas turbine engine 500 includes an engine case 560 that encases a compressor 512, a combustor 510 (e.g., a gas turbine combustor), and a fuel cell 520 and/or a fuel cell stack having a plurality of fuel cells (e.g., SOFCs) integrated with the combustor 510. According to one embodiment, the fuel cell 520 (e.g., solid oxide fuel cell) is designed into the outer and/or inner liners of the combustor 510. For example, according to one embodiment, the fuel cell 520 could be integrated into the combustor 510 according to the embodiment illustrated in FIGS. 1 to 3. Alternatively, according to another embodiment, the fuel cell 520 could comprise the system 400 with housing 410 illustrated in FIG. 4, which is then integrated into the outer and/or inner liners of the combustor 510. The fuel cell 520 can also be integrated into the outer and/or inner liners of the combustor 510 in another manner.

As shown in FIG. 5, the engine 500 further includes a fuel source 550, a pre-burner system 540, and a catalytic partial oxidation (C-POX) convertor 530. According to one embodiment, the pre-burner system 540 and the catalytic partial oxidation (C-POX) convertor 530 are manifolded together to provide conditioned air and fuel to a micromixer, such as, e.g., the fuel cell 520 (e.g., SOFC). According to an embodiment, the catalytic partial oxidation (C-POX) convertor 530, the pre-burner system 540, and the fuel cell 520 and/or fuel cell stack having a plurality of fuel cells (e.g., SOFCs) are closely coupled within the engine case 560 of the gas turbine engine 500 (or engine assembly), such that the catalytic partial oxidation (C-POX) convertor 530, the pre-burner system 540, and the fuel cell 520 and/or fuel cell stack are positioned as close as possible to each other within the engine case 560. A portion of fuel 544 from the fuel source 550 is directed to the pre-burner system 540 for raising the temperature of air 542 that is discharged from the compressor 512 to, for example, an operating point of the fuel cell 520 and/or up to 200° C. less than and/or up to 200° C. more than the operating point of the fuel cell 520, e.g., a temperature high enough to enable fuel cell temperature control (e.g., ~500° C. to 1000° C.), while another portion of fuel 534 from the fuel source 550 is directed to the catalytic partial oxidation (C-POX) convertor 530 for developing a hydrogen rich fuel stream. As the temperature of the air 542 that is discharged from the compressor 512 is raised to an operating point of the fuel cell 520 (e.g., 600° C. to 800° C.) and/or up to 200° C. less than and/or up to 200° C. more than the operating point of the fuel cell 520, this heated air 545 is then directed into the fuel cell 520 to facilitate the functioning of the fuel cell 520 (e.g., SOFC) located in a liner region of the combustor 510. In parallel, the portion of fuel 534 that is directed from the fuel source 550 into the catalytic partial oxidation convertor 530 is developed into a hydrogen rich fuel stream 532 that is also fed into the fuel cell 520.

According to another embodiment, the fuel source 550 can comprise a hydrogen ($H_2$) fuel, as opposed to (or in addition to) a hydrocarbon fuel source. According to this embodiment, the catalytic partial oxidation (C-POX) convertor 530 may not be necessary for this hydrogen ($H_2$) fuel source, and thus, the hydrogen ($H_2$) fuel stream (e.g., fuel stream 580) can be sent directly into the fuel cell 520 (e.g., SOFC) that is designed into the outer and/or inner liners of the combustor 510. According to one embodiment, when hydrogen ($H_2$) fuel is the fuel source 550, a heat-exchanger (not shown), a pre-burner system (e.g., pre-burner system 540), and/or a catalytic partial oxidation (C-POX) convertor (e.g., catalytic partial oxidation (C-POX) convertor 530) can be included to control the temperature of the hydrogen ($H_2$) fuel to at least one of (i) an operating point of the fuel cell 520 (e.g., SOFC), (ii) up to 200° C. less than the operating point of the fuel cell 520 (e.g., SOFC), and (iii) up to 200° C. more than the operating point of the fuel cell 520 (e.g., SOFC).

As further shown in FIG. 5, the combustor 510 also includes a pilot/main burner 515. During operation, the pilot/main burner 515 is used to start the engine 500 and to increase the operating temperature, pressure, and mass flow of air. Once the engine 500 is sufficiently high in temperature, pressure, and mass flow of air, the portion of fuel 534 is diverted from the fuel source 550 to the catalytic partial oxidation convertor 530 and the other portion of fuel 544 is diverted from the fuel source 550 to the pre-burner system 540 to increase the temperature of the portion of air 542 that is discharged from the compressor 512 to, for example, an operating point of the fuel cell 520 (e.g., 600° C. to 800° C.) and/or up to 200° C. less than and/or up to 200° C. more than the operating point of the fuel cell 520 to facilitate the functioning of the fuel cell 520 (e.g., SOFC) located in the liner region of the combustor 510, as discussed above. The hydrogen rich fuel stream 532 (i.e., a hydrogen and carbon monoxide stream) that is developed in the catalytic partial oxidation convertor 530 is utilized along with the air 545 that is heated by the pre-burner system 540 in the fuel cell 520 to generate electrical power. Unburned fuel and air 522 from the fuel cell 520 is channeled into the combustor 510 where a pilot/main flame from the pilot/main burner 515 is present and provides ignition to consume any unburned hydrogen and carbon monoxide effluents 518 from the fuel cell 520. According to one embodiment, the exhausted fuel and air flow 522 from the fuel cell 520 (e.g., SOFC) is consumed in the combustor 510 like a micromixer burner. The heated air (e.g., exhaust) is then channeled into the gas turbine nozzle 516 for work extraction by the turbine (see, e.g., turbine 112 of the gas turbine engine 102 of the embodiment of FIGS. 1 to 3). According to another embodiment, one or more pilot/main fuel nozzles (e.g., pilot/main burner 515) and/or injectors with a mixer and/or swirler are included within the combustor 510 that can aid in at least partially mixing air and fuel to facilitate combustion of fuel and air, the main/pilot flames being configured to combust the fuel directed into the combustor from the fuel cell stack into the one or more gaseous combustion products.

According to one embodiment of the present disclosure, by incorporating or integrating the fuel cell 520 (e.g., SOFC) along the combustor liner of the combustor 510 for a gas turbine engine 500 (e.g., an aircraft engine), in which a compressor 512 is connected upstream to the combustor 510 and a turbine (not shown) is connected downstream to the combustor 510, both air and fuel can be directed to the fuel cell 520 (SOFC) in a single pass, meaning there is no recycling of the unburned fuel or air from the fuel cell exhaust to the inlet of the fuel cell 520. Thus, there is no need for a separate air supply or any related control means in this configuration. However, because the inlet air for the fuel cell 520 (e.g., SOFC) comes solely from the upstream engine compressor 512 without any other separately controlled air source, the inlet air for the fuel cell 520 that is discharged from the compressor 512 is subject to the air temperature changes that occur at different flight stages. For example, the air within the aircraft engine compressor may work at 200° C. during idle, 600° C. during take-off, 450° C. during cruise, etc. This type of temperature change to the inlet air directed to the fuel cell may lead to significant thermal transient issues (or even thermal shock) to the ceramic materials of the fuel cell (e.g., SOFC), which could range from cracking to failure. Thus, according to embodiments of the present disclosure, by fluidly connecting the pre-burner system 540 to (i) the engine compressor 512 (at an upstream side to the pre-burner system 540) and (ii) the fuel cell 520 (e.g., SOFC) (at a downstream side to the pre-burner system 540), the pre-burner system 540 serves as a control means or system to maintain the air 545 being directed into the fuel cell 520 at a temperature at a desired range (e.g., 700° C. to 800° C.±200° C.). Furthermore, by integrating the pre-burner system 540 with the catalytic partial oxidation (C-POX) convertor 530, a better thermal management with faster startup could be achieved. This further improves the system operability.

In one embodiment, the diversion of fuel (e.g., fuel portions 534, 544) from the fuel source 550 can be individually controlled to better manage the temperature of the air flow 545 being directed into the fuel cell 520. For example, a controller (or control system) (e.g., hardware circuitry that includes and/or is coupled with one or more processors, such as microprocessors) can control valves which, in turn, control the flow of fuel to the pre-burner system 540 and/or the catalytic partial oxidation convertor 530. The temperature of the air 542 that is discharged from the compressor 512 can be controlled by controlling the flow of fuel to the pre-burner system 540 via the controller. For example, the controller can close or open valves to decrease or to increase (respectively) the amount of fuel flowing into the pre-burner system 540. The amount of fuel flowing into the pre-burner system 540 can be decreased to thereby decrease the temperature of the air 542 that is discharged from the compressor 512 and directed into the pre-burner system 540, or can be increased to thereby increase the temperature of the air 542 that is discharged from the compressor 512 and directed into the pre-burner system 540. Optionally, no fuel can be delivered to the pre-burner system 540 via the fuel source 550 to prevent the pre-burner system 540 from increasing and/or decreasing the temperature of the air 542 that is discharged from the compressor 512 and directed into the pre-burner system 540.

Figure 6:
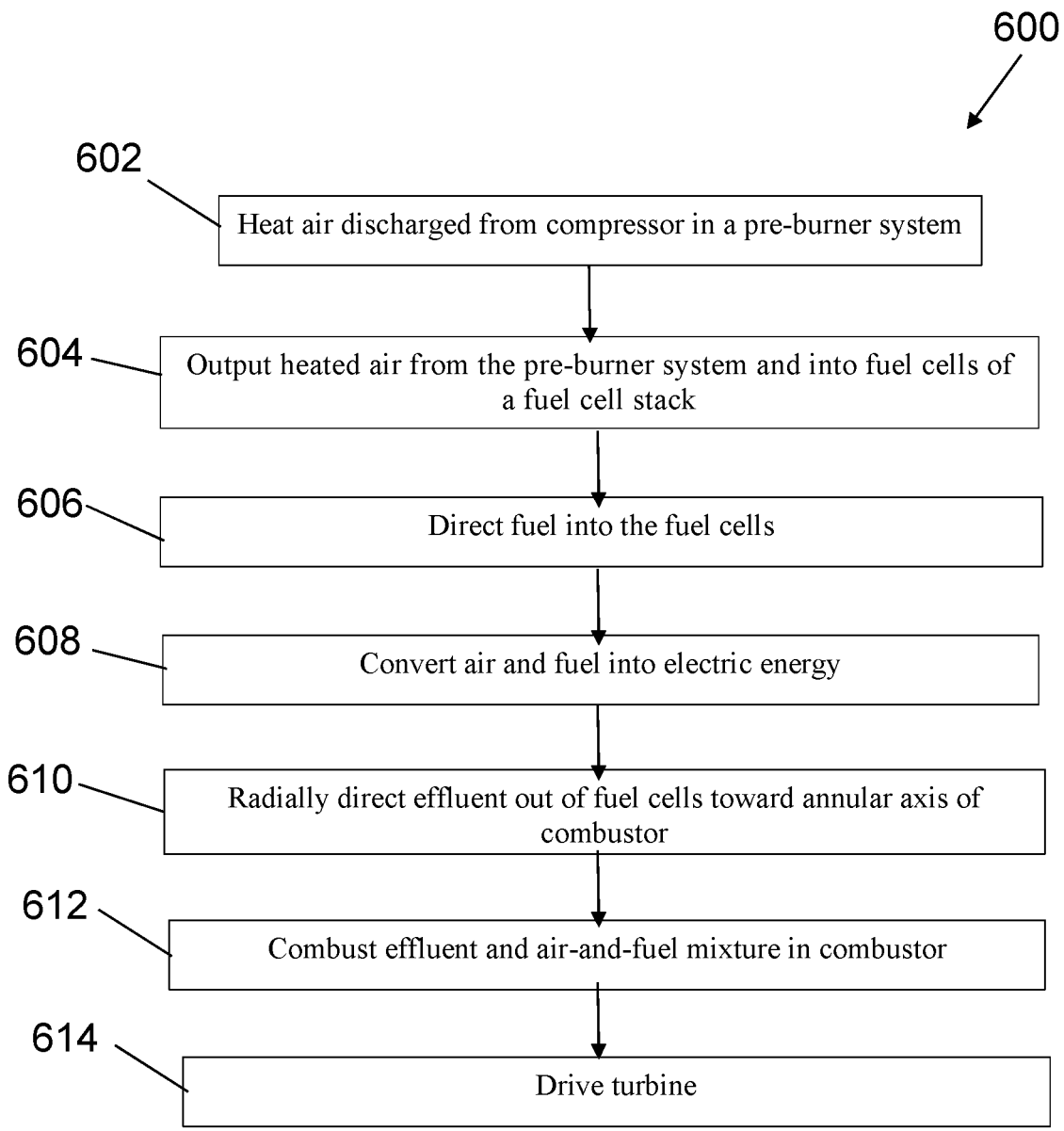
FIG. 6 illustrates a flowchart of one embodiment of a method of operating an integrated fuel cell and a combustor assembly.

FIG. 6 illustrates a flowchart of one embodiment of a method 600 of operating an integrated fuel cell and a combustor assembly. The method 600 can describe the operations performed in generating thrust and electrical current using the integrated fuel cell and combustor assemblies described herein (see, e.g., FIGS. 1, 4, and 5). At step 602, air that is discharged from a compressor of an engine is heated to, for example, an operating point of the fuel cell (e.g., 600° C. to 800° C.) and/or up to 200° C. less than and/or up to 200° C. more than the operating point of the fuel cell by a pre-burner system. At step 604, the heated or preheated air is output from the pre-burner system and into fuel cells of a fuel cell stack of the integrated fuel cell and combustor assembly. At step 606, fuel is directed into the fuel cells of the integrated fuel cell and combustor assembly via a fuel source and/or a catalytic partial oxidation (C-POX) convertor. The direction of fuel into the fuel cells (at step 606) and the flow of air into the fuel cells (at step 604) can occur simultaneously, concurrently, sequentially, or in a reverse order than as shown in FIG. 6.

At step 608, the air and fuel in the fuel cells are at least partially converted into electrical energy. For example, the fuel cells can be connected in a series to build up a direct current that is created in the fuel cells. This current can be used to power a load, such as a fan of the engine or another load or used to charge a battery. At step 610, effluent of the fuel cells is radially directed inward into the combustor and toward the annular axis of the combustor. The effluent can include unused air, unburned fuel, and/or other gaseous constituents of the fuel cells. At step 612, the effluent is combusted (at least partially) in the combustor. Additional air from the compressor and/or fuel from fuel injectors can be directed into the combustor to aid with the combustion. The combustion in the combustor generates gaseous combustion products. At step 614, a turbine of the engine is driven by the gaseous combustion products in the combustor. For example, exhaust from the combustor may be directed into the turbine to rotate the turbine.

Thus, in accordance with the principles of the disclosure, the arrangement of a pre-burner system upstream of a fuel cell (e.g., SOFC), but in parallel to a catalytic partial oxidation (C-POX) convertor that converts liquid fuel (such as, e.g., jet A or ethanol), such that (i) the pre-burner system feeds air heated to, for example, an operating point of the fuel cell (e.g., 600° C. to 800° C.) and/or up to 200° C. less than and/or up to 200° C. more than the operating point of the fuel cell into the cathode and anode sides of the fuel cell and (ii) the catalytic partial oxidation (C-POX) convertor feeds a hydrogen rich stream into the cathode and anode sides of the fuel cell, the effluents of which are dumped into a combustor and burned before being channeled to a gas turbine nozzle, is novel.

According to one embodiment of the present disclosure, a catalytic partial oxidation (C-POX) convertor, a pre-burner system, and a fuel cell (e.g., SOFC) are closely coupled within an engine (e.g., gas turbine engine).

According to one embodiment of the present disclosure, a catalytic partial oxidation (C-POX) convertor is included with a combination of a combustion system with an integrated fuel cell for a gas turbine engine to convert liquid fuel into a gaseous hydrogen/CO (carbon monoxide) stream.

According to one embodiment of the present disclosure, a fuel cell (e.g., SOFC) is closely coupled and/or integrated with a combustor, such that the exhaust of the fuel cell directly enters the combustor. Thus, according to embodiments of the present disclosure, there is no recycling of the unburned fuel from the fuel cell.

According to one embodiment of the present disclosure, a pilot/main burner or fuel nozzle along with a mixer within a combustor is used to initiate and maintain a flame that consumes unburned fuel from a fuel cell (e.g., SOFC). According to another embodiment, engine fuel flow is divided into two streams: (i) a first stream that is directed to the pilot burner of the combustor and (ii) a second stream that is directed to the fuel cell (e.g., SOFC) and/or a catalytic partial oxidation (C-POX) convertor.

According to one embodiment of the present disclosure, a control system is included to maintain an exit temperature of air of a pre-burner system at 500° C. to 1000° C. at all operating conditions.

In accordance with the principles of the disclosure, a first challenge of maintaining air temperature to a fuel cell (e.g., SOFC) to, for example, an operating point of the fuel cell (e.g., 600° C. to 800° C.) and/or up to 200° C. less than and/or up to 200° C. more than the operating point of the fuel cell can be solved by including a combustion system (e.g., a pre-burner system) that consumes a small amount of fuel to enable control of the air temperature of air reaching the fuel cell.

In accordance with the principles of the disclosure, a second challenge of creating a mixture of hydrogen and carbon monoxide to enable a fuel cell to function can be solved by including a catalytic partial oxidation (C-POX) convertor that converts fuel ethanol with air to a stream containing hydrogen, carbon monoxide, and nitrogen.

In accordance with the principles of the disclosure, a third challenge of managing fuel that is injected into a fuel cell (e.g., SOFC), but is not consumed, can be solved by locating the fuel cell next to and/or within a gas turbine combustor having a pilot/main fuel nozzle in such a way that the effluents from the fuel cell, which contain unused fuel, are consumed in the gas turbine combustor thereby releasing heat and being fully converted to water and carbon dioxide.

In accordance with the principles of the disclosure, a combination of a combustion system with an integrated fuel cell can enable steady state and transient operation of a fuel cell (e.g., SOFC) as a topping cycle with a gas turbine engine (e.g., a Brayton cycle gas turbine engine) being the bottoming cycle. This combination provides increased efficiency in comparison with a conventional gas turbine engine (e.g., an advanced Brayton cycle gas turbine engine).

According to one embodiment of the present disclosure, depending on the design of the fuel cell (e.g., SOFC), the combustor, and the engine cycle, a topping cycle using the integrated combustor and fuel cell assembly according to embodiments of the present disclosure can provide from 300

KW to 2000 KW topping electrical power in a gas turbine engine, increasing core efficiency by 5 to 12% points.

Further aspects of the present disclosure are provided by the subject matter of the following clauses.

An engine assembly comprising: (a) a combustor; (b) a fuel cell stack integrated with the combustor, the fuel cell stack configured to direct fuel and air exhaust from the fuel cell stack into the combustor; and (c) a pre-burner system fluidly connected to the fuel cell stack, the pre-burner system being configured to control a temperature of an air flow directed into the fuel cell stack, wherein the combustor is configured to combust the fuel and air exhaust from the fuel cell stack into one or more gaseous combustion products that drive a downstream turbine.

The engine assembly of any preceding clause, further comprising a compressor that is fluidly connected upstream of (i) the combustor and (ii) the pre-burner system, wherein the compressor is configured to direct a portion of air into the pre-burner system.

The engine assembly of any preceding clause, further comprising a fuel source that provides fuel and is fluidly connected to the pre-burner system, wherein a portion of the fuel is directed from the fuel source to the pre-burner system to raise a temperature of the portion of air directed into the pre-burner system from the compressor.

The engine assembly of any preceding clause, further comprising a catalytic partial oxidation convertor that is fluidly connected to the fuel cell stack, wherein the catalytic partial oxidation convertor is configured to develop a hydrogen rich fuel stream to be directed into the fuel cell stack.

The engine assembly of any preceding clause, wherein the catalytic partial oxidation convertor, the pre-burner system, and the fuel cell stack are closely coupled within the engine assembly.

The engine assembly of any preceding clause, further comprising a fuel source that provides fuel and is fluidly connected to the pre-burner system and the catalytic partial oxidation convertor, wherein (i) a first portion of the fuel is directed from the fuel source to the pre-burner system to raise a temperature of a portion of air directed into the pre-burner system from a compressor and (ii) a second portion of the fuel is directed from the fuel source to the catalytic partial oxidation convertor for developing the hydrogen rich fuel stream.

The engine assembly of any preceding clause, further comprising a hydrogen fuel source that provides a hydrogen fuel stream into the fuel cell stack.

The engine assembly of any preceding clause, wherein the temperature of the air flow being directed into the fuel cell stack from the pre-burner system is from 500° C. to 1000° C.

The engine assembly of any preceding clause, wherein the temperature of the air flow being directed into the fuel cell stack from the pre-burner system is from 600° C. to 800° C.

The engine assembly of any preceding clause, wherein the combustor further comprises one or more pilot/main fuel nozzles being configured to combust the fuel and air exhaust directed into the combustor from the fuel cell stack into the one or more gaseous combustion products.

The engine assembly of any preceding clause, further comprising an engine case that encases the combustor, the fuel cell stack, and the pre-burner system.

The engine assembly of any preceding clause, further comprising the downstream turbine connected downstream to the combustor.

The engine assembly of any preceding clause, further comprising a control system that is configured to control the temperature of the air flow directed into the fuel cell stack from the pre-burner system, by controlling flow rates of fuel and/or air stream directed into the pre-burner system, to at least one of (i) an operating point of the fuel cell stack, (ii) up to 200° C. less than the operating point of the fuel cell stack, and (iii) up to 200° C. more than the operating point of the fuel cell stack.

The engine assembly of any preceding clause, wherein the fuel cell stack is at least one of (i) circumferentially surrounding the combustor and (ii) axially coupled to the combustor.

The engine assembly of any preceding clause, wherein the fuel cell stack is integrated within at least one of an inner liner and an outer liner of the combustor.

The engine assembly of any preceding clause, wherein the fuel cell stack is a solid oxide fuel cell stack.

An engine assembly comprising: (a) a combustor; (b) a fuel cell stack integrated with the combustor, the fuel cell stack configured to direct fuel and air exhaust from the fuel cell stack into the combustor; (c) a pre-burner system fluidly connected to the fuel cell stack, the pre-burner system being configured to control a temperature of an air flow directed into the fuel cell stack; and (d) a catalytic partial oxidation convertor that is fluidly connected to the fuel cell stack, wherein the catalytic partial oxidation convertor is configured to develop a hydrogen rich fuel stream to be directed into the fuel cell stack, wherein the combustor is configured to combust the fuel and air exhaust from the fuel cell stack into one or more gaseous combustion products that drive a downstream turbine.

The engine assembly of any preceding clause, further comprising a compressor that is fluidly connected upstream of (i) the combustor and (ii) the pre-burner system, wherein the compressor is configured to direct a portion of air into the pre-burner system.

The engine assembly of any preceding clause, wherein the catalytic partial oxidation convertor, the pre-burner system, and the fuel cell stack are closely coupled within the engine assembly.

The engine assembly of any preceding clause, further comprising a fuel source that provides fuel and is fluidly connected to the pre-burner system and the catalytic partial oxidation convertor, wherein (i) a first portion of the fuel is directed from the fuel source to the pre-burner system to raise a temperature of a portion of air directed into the pre-burner system from a compressor and (ii) a second portion of the fuel is directed from the fuel source to the catalytic partial oxidation convertor for developing the hydrogen rich fuel stream.

The engine assembly of any preceding clause, wherein the temperature of the air flow being directed into the fuel cell stack from the pre-burner system is from 500° C. to 1000° C.

The engine assembly of any preceding clause, wherein the temperature of the air flow being directed into the fuel cell stack from the pre-burner system is from 600° C. to 800° C.

The engine assembly of any preceding clause, wherein the combustor further comprises one or more pilot/main fuel nozzles being configured to combust the fuel and air exhaust directed into the combustor from the fuel cell stack into the one or more gaseous combustion products.

The engine assembly of any preceding clause, further comprising an engine case that encases the combustor, the fuel cell stack, the pre-burner system, and the catalytic partial oxidation convertor.

The engine assembly of any preceding clause, further comprising the downstream turbine connected downstream to the combustor.

The engine assembly of any preceding clause, further comprising a control system that is configured to control the temperature of the air flow directed into the fuel cell stack from the pre-burner system, by controlling flow rates of fuel and/or air stream directed into the pre-burner system, to at least one of (i) an operating point of the fuel cell stack, (ii) up to 200° C. less than the operating point of the fuel cell stack, and (iii) up to 200° C. more than the operating point of the fuel cell stack.

A method comprising: (a) heating air discharged from a compressor in a pre-burner system; (b) outputting air that is heated by the pre-burner system into the fuel cells of a fuel cell stack; (c) directing fuel into the fuel cells of the fuel cell stack; (d) converting at least some of the air that enters the fuel cells of the fuel cell stack from the pre-burner system and the fuel into electrical current using the fuel cell stack; (e) directing fuel and air exhaust from the fuel cell stack (e.g., radially and/or axially) into a combustor toward an annular axis of the combustor; (f) combusting the fuel and air exhaust from the fuel cell stack into one or more gaseous combustion products in the combustor; and (g) driving a turbine of a turbine engine using the one or more gaseous combustion products.

Although the foregoing description is directed to the preferred embodiments, it is noted that other variations and modifications will be apparent to those skilled in the art, and may be made without departing from the spirit or scope of the disclosure. Moreover, features described in connection with one embodiment may be used in conjunction with other embodiments, even if not explicitly stated above.

The invention claimed is:

1. An engine assembly comprising:
(a) a combustor;
(b) a fuel cell stack integrated with the combustor;
(c) a catalytic partial oxidation convertor that is fluidly connected to the fuel cell stack, wherein the catalytic partial oxidation convertor is configured to develop a stream of hydrogen rich fuel to be directed into the fuel cell stack; and
(d) a pre-burner system disposed upstream from and fluidly connected to the fuel cell stack separately from and in parallel with the catalytic partial oxidation convertor, the pre-burner system being configured to control a temperature of an air flow directed into the fuel cell stack, wherein the pre-burner system is fluidly connected directly to the fuel cell stack separately from the catalytic partial oxidation convertor, wherein the fuel cell stack is configured to direct the stream of hydrogen rich fuel and air exhaust from the fuel cell stack into the combustor, wherein the combustor is configured to combust the stream of hydrogen rich fuel and the air exhaust from the fuel cell stack into one or more gaseous combustion products that drive a downstream turbine.

2. The engine assembly of claim 1, further comprising a compressor that is fluidly connected upstream of (i) the combustor and (ii) the pre-burner system, wherein the compressor is configured to direct a portion of air into the pre-burner system.

3. The engine assembly of claim 2, further comprising a fuel source that provides fuel to and is fluidly connected to the pre-burner system and the catalytic partial oxidation convertor, wherein a portion of the fuel is directed from the fuel source to the pre-burner system to raise a temperature of the portion of the air flow directed into the pre-burner system from the compressor.

4. The engine assembly of claim 1, wherein the catalytic partial oxidation convertor, the pre-burner system, and the fuel cell stack are manifolded together within the engine assembly.

5. The engine assembly of claim 4, further comprising a fuel source that provides fuel and is fluidly connected to the pre-burner system and the catalytic partial oxidation convertor, wherein (i) a first portion of the fuel is directed from the fuel source to the pre-burner system to raise a temperature of a portion of the air directed into the pre-burner system from a compressor and (ii) a second portion of the fuel is directed from the fuel source to the catalytic partial oxidation convertor for developing the stream of hydrogen rich fuel.

6. The engine assembly of claim 1, further comprising a hydrogen fuel source.

7. The engine assembly of claim 1, wherein the temperature of the air flow being directed into the fuel cell stack from the pre-burner system is from 500° C. to 1000° C.

8. The engine assembly of claim 1, wherein the combustor further comprises one or more pilot/main fuel nozzles being configured to combust the stream of hydrogen rich fuel and the air exhaust directed into the combustor from the fuel cell stack into the one or more gaseous combustion products.

9. The engine assembly of claim 1, further comprising an engine case that encases the combustor, the fuel cell stack, and the pre-burner system.

10. The engine assembly of claim 1, further comprising the downstream turbine connected downstream of the combustor.

11. The engine assembly of claim 1, wherein the engine assembly is configured to control the temperature of the air flow directed into the fuel cell stack from the pre-burner system, by controlling a flow rate of a fuel and a flow rate of an air stream directed into the pre-burner system, to at least one of (i) an operating point of the fuel cell stack, (ii) up to 200° C. less than the operating point of the fuel cell stack, and (iii) up to 200° C. more than the operating point of the fuel cell stack.

12. The engine assembly of claim 1, wherein the fuel cell stack is at least one of (i) circumferentially surrounding the combustor and (ii) axially coupled to the combustor.

13. The engine assembly of claim 1, wherein the fuel cell stack is integrated within at least one of an inner liner and an outer liner of the combustor.

14. The engine assembly of claim 1, wherein the fuel cell stack is a solid oxide fuel cell stack.

15. An engine assembly comprising:
(a) a combustor;
(b) a fuel cell stack integrated with the combustor, the fuel cell stack configured to direct a hydrogen rich fuel stream and air exhaust from the fuel cell stack into the combustor;
(c) a pre-burner system fluidly connected to and disposed upstream from the fuel cell stack, the pre-burner system being configured to control a temperature of an air flow directed into the fuel cell stack from the pre-burner system; and
(d) a catalytic partial oxidation convertor that is fluidly connected to the fuel cell stack separately from and in parallel with the pre-burner system, wherein the catalytic partial oxidation convertor is configured to develop the hydrogen rich fuel stream to be directed into the fuel cell stack, wherein the pre-burner system is fluidly connected directly to the fuel cell stack separately from the catalytic partial oxidation convertor, wherein the combustor is configured to combust the hydrogen rich fuel stream and the air exhaust from the fuel cell stack into one or more gaseous combustion products that drive a downstream turbine.

16. The engine assembly of claim 15, further comprising a compressor that is fluidly connected upstream of (i) the combustor and (ii) the pre-burner system, wherein the compressor is configured to direct a portion of the air flow into the pre-burner system.

17. The engine assembly of claim 15, wherein the temperature of the air flow being directed into the fuel cell stack from the pre-burner system is from 500° C. to 1000° C.

18. The engine assembly of claim 15, further comprising a fuel source that provides fuel and is fluidly connected to the pre-burner system and the catalytic partial oxidation convertor, wherein (i) a first portion of the fuel is directed from the fuel source to the pre-burner system to raise a temperature of a portion of the air flow directed into the pre-burner system from a compressor and (ii) a second portion of the fuel is directed from the fuel source to the catalytic partial oxidation convertor for developing the hydrogen rich fuel stream.

19. The engine assembly of claim 15, wherein the engine assembly is configured to control the temperature of the air flow directed into the fuel cell stack from the pre-burner system, by controlling a flow rate of fuel and a flow rate of an air stream directed into the pre-burner system, to at least one of (i) an operating point of the fuel cell stack, (ii) up to 200° C. less than the operating point of the fuel cell stack, and (iii) up to 200° C. more than the operating point of the fuel cell stack.

* * * * *